United States Patent
Small et al.

(10) Patent No.: US 11,424,849 B2
(45) Date of Patent: Aug. 23, 2022

(54) MAXIMIZING THROUGHPUT ON A VARIABLE BANDWIDTH COMMUNICATION INTERFACE

(71) Applicant: AT&T Intellectual Property I, L.P., Atlanta, GA (US)

(72) Inventors: David Small, Dublin, CA (US); Joseph Zolik, Monmouth Beach, NJ (US); Sridhar Narahari, Milpitas, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 172 days.

(21) Appl. No.: 16/714,248

(22) Filed: Dec. 13, 2019

(65) Prior Publication Data
US 2021/0184785 A1   Jun. 17, 2021

(51) Int. Cl.
*H04L 1/00* (2006.01)
*H04L 43/0829* (2022.01)
*H04L 43/0894* (2022.01)

(52) U.S. Cl.
CPC ........ *H04L 1/0002* (2013.01); *H04L 43/0829* (2013.01); *H04L 43/0894* (2013.01)

(58) Field of Classification Search
CPC ..... H04L 43/00; H04L 43/16; H04L 43/0882; H04L 47/10; H04L 47/29; H04L 65/4092; H04L 1/0002; H04L 43/0829
See application file for complete search history.

(56) References Cited

U.S. PATENT DOCUMENTS

| | | | |
|---|---|---|---|
| 8,615,598 B2 * | 12/2013 | Wakuda | H04L 65/80 709/231 |
| 10,305,810 B2 | 5/2019 | Spencer, IV | |
| 2004/0190452 A1 * | 9/2004 | Imiya | H04L 43/00 370/232 |
| 2018/0183718 A1 * | 6/2018 | Xie | H04L 45/00 |

OTHER PUBLICATIONS

"Packet Pair Technique" published online at [https://www.usenix.org/legacy/publications/library/proceedings/usits01/full_papers/lai/lai_html/node2.html], retrieved May 25, 2021, 7 pages.

* cited by examiner

*Primary Examiner* — Jae Y Lee
*Assistant Examiner* — Aixa A Guadalupe Cruz
(74) *Attorney, Agent, or Firm* — Amin, Turocy & Watson, LLP

(57) ABSTRACT

Maximizing throughput on a variable bandwidth communication interface is presented herein. A first device, based on information that was received from a second device via a communication link communicatively coupling the first device to the second device, determines a rate of change of data packet loss of first data packets that have been transmitted, based on a first data transmission rate via the communication link, from the first device to the second device; and in response to the rate of change of data packet loss being determined to satisfy a defined condition that is based on a defined state of a group of defined states corresponding to respective data transmission rates comprising the first data transmission rate, modifies the first data transmission rate to obtain a second data transmission rate, and transmits, based on the second data transmission rate, second data packets to the second device.

20 Claims, 11 Drawing Sheets

DATA TRANSMISSION SHAPER COMPONENT 110/112

DATA PACKET LOSS MEASUREMENT COMPONENT 310

DATA TRANSMISSION COMPONENT 320

PROCESSING COMPONENT 330

MEMORY COMPONENT 340

FIG. 3

MAXIMIZING THROUGHPUT ON A VARIABLE BANDWIDTH COMMUNICATION INTERFACE

TECHNICAL FIELD

The subject disclosure generally relates to embodiments for maximizing throughput on a variable bandwidth communication interface.

BACKGROUND

Conventional data communication technologies, e.g., wired, wireless, etc. compensate for reduced data traffic performance at an application and/or communication protocol level, e.g., via a transport layer (e.g., layer 4 or higher)—without regard to physical layer issues, e.g., loss of signaling, etc. Further, such technologies typically treat all data loss as indicative of network congestion, e.g., utilizing transmission control protocol (TCP) based error mediation elements, e.g., re-transmitting data, delaying or "backing off" data transmission(s), etc. to reduce loss or maximize throughput. In this regard, although wireless connectivity of devices often corresponds to lossy, error-prone, etc. radio/radio frequency (RF) link conditions, conventional data communication technologies erroneously assume that associated reduced data traffic performance, data packet loss, etc. is due to network congestion and/or ignore reduced RF link conditions.

Consequently, conventional data communication technologies have had some drawbacks with respect to optimizing available network communication bandwidth, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 3 illustrates a block diagram of a data transmission shaper component, in accordance with various example embodiments;

DETAILED DESCRIPTION

Figure 1:
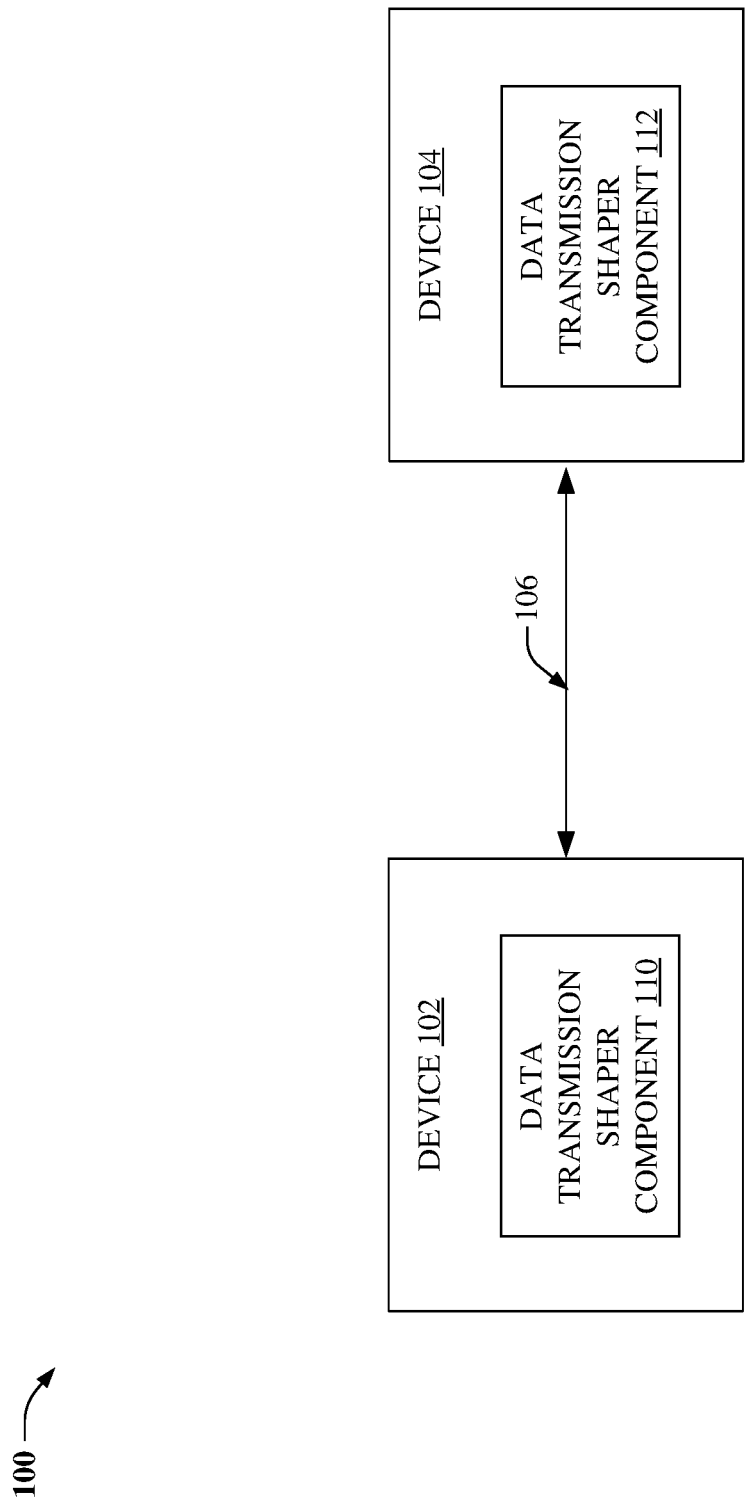
FIG. 1 illustrates a block diagram of a network that facilitates maximizing throughput on a variable bandwidth wired and/or wireline communication interface, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional data communication technologies have had some drawbacks with respect to attributing reduced communication performance to network congestion—without considering reduced, lossy, etc. RF link conditions as being a cause of reduced communication performance. Various embodiments disclosed herein can improve, maximize, etc. available communication throughput, bandwidth, etc. on a given network interface by dynamically "shaping", controlling, modifying, etc. a transmission rate of data on such interface.

For example, in embodiment(s), a first communication device that is communicatively coupled to a second communication device via a wired, wireless, etc. communication link comprises a data transmission shaper component comprising a data packet loss measurement component and a data transmission component. In this regard, the data packet loss measurement component receives, from the second communication device, information representing data packet loss, e.g., absolute packet loss, of a group of data packets that have been transmitted, based on a first data transmission rate via the communication link, from the first communication device to the second communication device. In an embodiment, the information comprises sequence numbers corresponding to data packets that have been transmitted by the first communication device and received by the second communication device.

Further, based on the information, the data packet loss measurement component determines a rate of change, e.g., speed, of the data packet loss, e.g., a change of the data packet loss over a defined period, e.g., recheck period, that is based on the first data transmission rate. In turn, the data transmission component determines whether the rate of change of the data packet loss satisfies a defined condition that is based on a defined state of a group of defined states corresponding to respective data transmission rates comprising the first data transmission rate.

In this regard, in embodiment(s), the group of defined states comprises a maximum transmission rate state corresponding to a defined maximum data transmission rate, a reducing transmission rate state corresponding to a data transmission rate that is being decreased, a minimum transmission rate state corresponding to a defined minimum data transmission rate, a steady state, or stable, transmission rate state corresponding to a data transmission rate that is not being changed, and an increasing transmission rate state corresponding to a data transmission rate that is being increased.

In turn, in response to the rate of change of the data packet loss being determined to satisfy the defined condition that is based on the defined state, e.g., representing that the data transmission component should change to a different state corresponding to a defined data transmission rate, the data transmission component transmits, based on the defined data transmission rate, data packets to the second communication device.

In an embodiment, in response to the rate of change of the data packet loss being determined not to satisfy the defined condition that is based on the defined state, e.g., representing that the data transmission component should not change states, the data transmission component transmits, based on the first data transmission rate, data packets to the second communication device.

In another embodiment, the defined period, recheck period, etc. is a first defined recheck period, the second data transmission rate is greater than the first data transmission rate, the rate of change of data packet loss is a first rate of change of data packet loss, and the data transmission component determines a second rate of change of data packet loss that has occurred on the communication link based on a second defined recheck period that is less than the first defined recheck period, e.g., representing that the data transmission component has changed from the increasing transmission rate state to the maximum transmission rate state.

In yet another embodiment, the defined period, recheck period, etc. is a first defined recheck period, the second data transmission rate is greater than the first data transmission rate, the rate of change of data packet loss is a first rate of change of data packet loss, and the data transmission component determines a second rate of change of data packet loss that has occurred on the communication link based on a second defined recheck period that is greater than the first defined recheck period, e.g., representing that the data transmission component has changed from the minimum transmission rate state to the increasing transmission rate state, or has changed from the steady, stable, etc. transmission rate state to the increasing transmission rate state.

In one embodiment, the defined period, recheck period, etc. is a first defined recheck period, the second data transmission rate is less than the first data transmission rate, the rate of change of data packet loss is a first rate of change of data packet loss, and the data transmission component determines a second change rate of data packet loss that has occurred on the communication link based on a second defined recheck period that is less than the first defined recheck period, e.g., representing that the data transmission component has changed from the reducing transmission rate state to the minimum transmission rate state.

In an embodiment, the data transmission component determines whether an amount of the data packet loss is greater than a defined data packet loss floor. In this regard, in embodiment(s), in response to the amount of the data packet loss being determined to be greater than the defined data packet loss floor, the data transmission component reduces the first data transmission rate by a defined amount to obtain the second data transmission rate, e.g., representing that the data transmission component has changed from the maximum transmission rate state to the reducing transmission rate state.

In one embodiment, a method comprises: in response to receiving, by a first device comprising a processor, information representing packet loss that has occurred on a communication medium communicatively coupling the first device to a second device, determining, by the first device, a change in the packet loss that has occurred over a defined period—the defined period being based on a transmission rate of the first device; and in response to the change in the packet loss being determined to satisfy a defined condition corresponding to the transmission rate of the first device, modifying, by the first device, the transmission rate of the first device to obtain a modified transmission rate, and based on the modified transmission rate, transmitting, by the first device via the communication medium, data to the second device.

In another embodiment, the method further comprises: receiving, by the first device, the information from the second device—the information representing a number of data packets that the second device has received from the first device. In this regard, in yet another embodiment, the determining the change in the packet loss comprises determining, over the defined period, a change in the number of data packets that the second device has received from the first device.

In an embodiment, the defined condition is a first defined condition, and the method further comprises: in response to the change in the packet loss being determined to satisfy a second defined condition corresponding to the transmission rate of the first device (e.g., representing that the transmission rate should not change), transmitting, by the first device based on the transmission rate via the communication medium, the data to the second device.

In one embodiment, the modified transmission rate is greater than the transmission rate, the change in the packet loss is a first change in packet loss, the defined period is a first defined period, and the method further comprises: determining, by the first device, a second change in packet loss that has occurred on the communication medium over a second defined period that is less than the first defined period.

In another embodiment, the modified transmission rate is less than the transmission rate, the change in the packet loss is a first change in packet loss, the defined period is a first defined period, and the method further comprises: determining, by the first device, a second change in packet loss that has occurred on the communication medium over a second defined period that is less than the first defined period.

In yet another embodiment, a machine-readable medium, comprises executable instructions that, when executed by a first device comprising a processor, facilitate performance of operations, comprising: in response to a change in data packet loss corresponding to a first group of data packets that have been transmitted, by the first device to a second device based on a transmission rate of the first device, being determined, over a defined period that is based on the transmission rate, to satisfy a defined condition with respect to the transmission rate, modifying the transmission rate to obtain a modified transmission rate; and based on the modified transmission rate, transmitting a second group of data packets to the second device.

In an embodiment, the defined condition is a first defined condition, and the operations further comprise: in response to the change in data packet loss being determined, over the defined period, to satisfy a second defined condition with respect to the transmission rate, transmitting, based on the transmission rate, a second group of data packets to the second device.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As described above, conventional data communication technologies have had some drawbacks with respect to compensating for reduced data traffic performance via an application and/or communication protocol level. Further, such technologies have had some drawbacks with respect to treating data loss as indicative of network congestion, without regard to loss of signaling issues. To address these and other concerns of conventional data communication technologies, various embodiments disclosed herein can maximize available communication bandwidth by dynamically modifying a data transmission rate on a communication interface.

Figure 2:
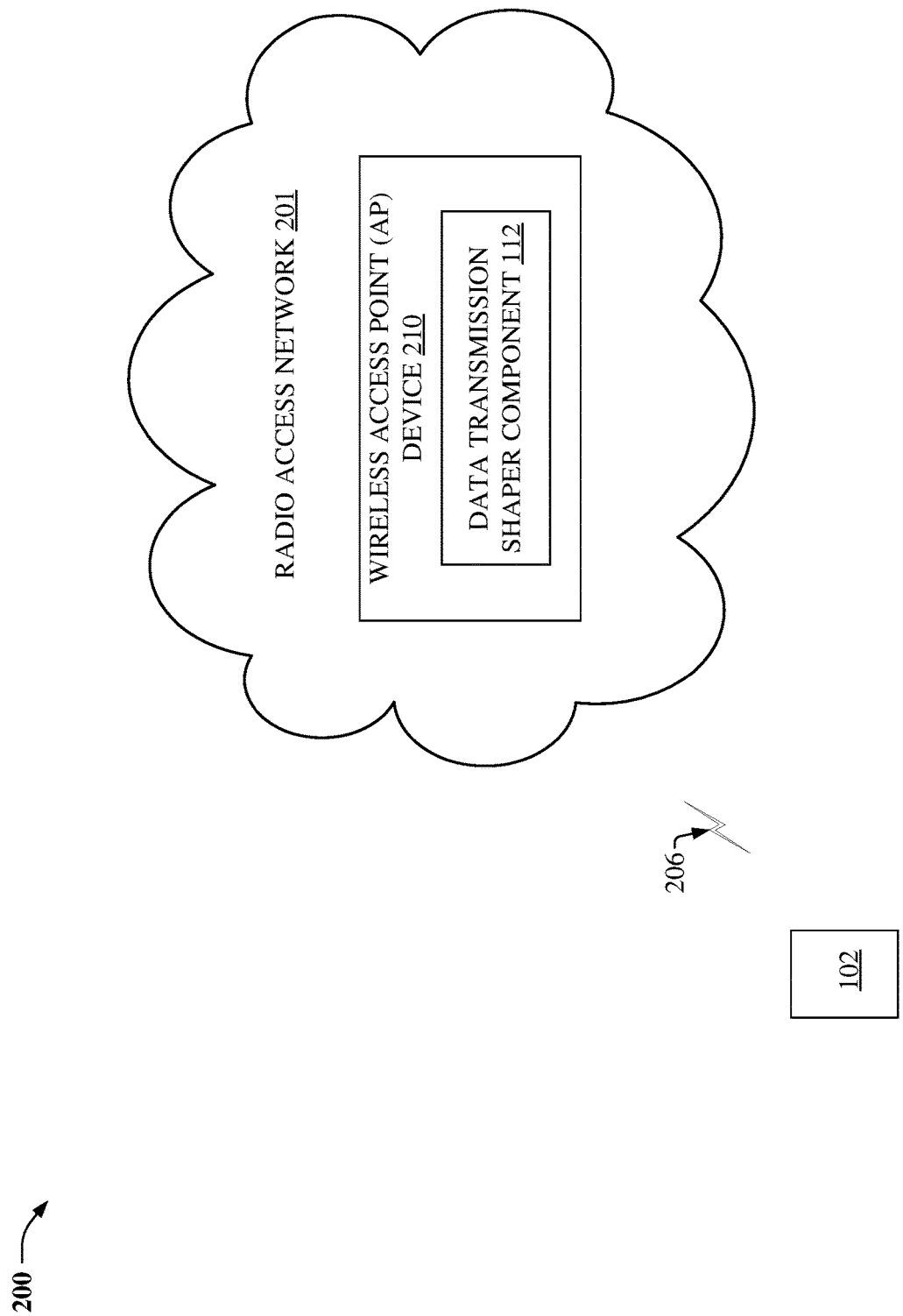
FIG. 2 illustrates a block diagram of a network that facilitates maximizing throughput on a variable bandwidth wireless communication interface, in accordance with various example embodiments.

Now referring to FIGS. 1-3, block diagrams of a network (100) that facilitates maximizing throughput on a wired/wireline and/or wireless communication interface (106), a network (200) that facilitates maximizing throughput on a wireless communication interface (206), and a data transmission shaper component (110, 112) are illustrated, respectively, in accordance with various example embodiments.

As illustrated by FIG. 1, a first communication device (102, 104)—communicatively coupled via wired/wireline, wireless, etc. communication link, interface, medium, etc. (106) to a second communication device (104, 102)—comprises a data transmission shaper component (110, 112) comprising a data packet loss measurement component (310) and a data transmission component (320). In another embodiment illustrated by FIG. 2, a first communication device (102, 210)—communicatively coupled via a wireless communication link (206) to a second communication device (210, 102)—comprises the data shaper component comprising the data packet loss measurement component and the data transmission component.

In this regard, in various embodiment(s), the data packet loss measurement component receives, from the second communication device, information representing data packet loss, e.g., absolute packet loss, of a group of data packets that have been transmitted, based on a first data transmission rate via the communication link, from the first communication device to the second communication device. In embodiment(s), the information comprises sequence numbers corresponding to data packets that have been transmitted by the first communication device and received by the second communication device.

In turn, based on the information, the data packet loss measurement component determines a rate of change, speed, etc. of the data packet loss, e.g., a change in the data packet loss over a defined period, recheck period, etc. In embodiment(s), the recheck period is based on the first data transmission rate of the first device, e.g., becoming smaller (e.g., checking for data loss more frequently) as the first data transmission rate approaches a defined maximum data transmission rate of the device (e.g., transceiver (not shown) of the device), and/or a defined minimum data transmission rate of the device, and becoming larger as the first data transmission rate approaches a steady state, or stable, data transmission rate, e.g., corresponding to a rate of data packet loss that has been determined, via the data transmission component, to be below a defined rate of data packet loss representing that data throughput of the communication link has been optimized, maximized, etc.

In this regard, the data transmission component determines whether the rate of change of the data packet loss satisfies a defined condition that is based on a defined state of a group of defined states corresponding to respective data transmission rates comprising the first data transmission rate. In embodiment(s), the group of defined states comprises a maximum transmission rate state corresponding to the defined maximum data transmission rate, a reducing transmission rate state corresponding to a data transmission rate that is being decreased, a minimum transmission rate state corresponding to the defined minimum data transmission rate, a steady state, or stable, transmission rate state corresponding to a data transmission rate, e.g., stable data transmission rate, that is not being changed, and an increasing transmission rate state corresponding to a data transmission rate that is being increased.

In turn, in response to the rate of change of the data packet loss being determined to satisfy the defined condition that is based on the defined state, e.g., representing that the data transmission component should change to a different state corresponding to a defined data transmission rate, the data transmission component transmits, based on the defined data transmission rate, data packets to the second communication device.

In an embodiment, in response to the rate of change of the data packet loss being determined not to satisfy the defined condition that is based on the defined state, e.g., representing that the data transmission component should not change states, the data transmission component transmits, based on the first data transmission rate, data packets to the second communication device.

In another embodiment, the defined period, recheck period, etc. is a first defined recheck period, the second data transmission rate is greater than the first data transmission rate, the rate of change of data packet loss is a first rate of change of data packet loss, and the data transmission component determines a second rate of change of data packet loss that has occurred on the communication link based on a second defined recheck period that is less than the first defined recheck period, e.g., representing that the data transmission component has changed from the increasing transmission rate state to the maximum transmission rate state.

In yet another embodiment, the defined period, recheck period, etc. is a first defined recheck period, the second data transmission rate is greater than the first data transmission rate, the rate of change of data packet loss is a first rate of change of data packet loss, and the data transmission component determines a second rate of change of data packet loss that has occurred on the communication link based on a second defined recheck period that is greater than the first defined recheck period, e.g., representing that the data transmission component has changed from the minimum transmission rate state to the increasing transmission rate state or the steady state, stable, etc. transmission rate state.

In one embodiment, the defined period, recheck period, etc. is a first defined recheck period, the second data transmission rate is less than the first data transmission rate, the rate of change of data packet loss is a first rate of change of data packet loss, and the data transmission component determines a second change rate of data packet loss that has occurred on the communication link based on a second defined recheck period that is less than the first defined recheck period, e.g., representing that the data transmission component has changed from the reducing transmission rate state to the minimum transmission rate state.

In an embodiment, the data transmission component determines whether an amount of the data packet loss is greater than a defined data packet loss floor. In this regard, in embodiment(s), in response to the amount of the data packet loss being determined to be greater than the defined data packet loss floor, the data transmission component reduces the first data transmission rate by a defined amount to obtain the second data transmission rate, e.g., representing that the data transmission component has changed from the maximum transmission rate state to the reducing transmission rate state; representing that the data transmission component has changed from the increasing transmission rate state to the steady, or stable, transmission rate state.

Referring again to FIG. 2, in embodiment(s), a radio access network (RAN) (201) can comprise various coverage cells (not shown), or wireless coverage areas (not shown), to communicatively couple, via the wireless communication link, the first communication device to the second communication device. In this regard, the wireless communication link can comprise cellular wireless technologies, e.g., 4G, 5G, and beyond; 3GPP UMTS; high speed packet access (HSPA); 3GPP LTE; third generation partnership project 2 (3GPP2); ultra-mobile broadband (UMB); LTE-A; etc. corresponding to the RAN. In turn, the RAN can comprise base station(s) (not shown), base transceiver station(s) (not shown), access point(s) (210), etc. and associated electronic circuitry and deployment site(s), in addition to the respective wireless radio links, operated in accordance with the base station(s), etc.

The respective radio links can comprise an over-the-air wireless link comprising a downlink (DL) and an uplink (UL) (both not shown) that can utilize a predetermined band of radio frequency (RF) spectrum associated with, e.g., 4G, 5G, and beyond; cellular; LTE; LTE advanced (LTE-A); GSM; 3GPP universal mobile telecommunication system (UMTS); Institute of Electrical and Electronics Engineers (IEEE) 802.XX technology (WiFi, Bluetooth, etc.); worldwide interoperability for microwave access (WiMax); a wireless local area network (WLAN); Femto; near field communication (NFC); Wibree; Zigbee; satellite; WiFi Direct; etc. Accordingly, the RAN can be associated with RF spectrums corresponding to respective types of wireless technologies including, but not limited to, cellular, WiFi, WiMax, WLAN, Femto, NFC, Wibree, Zigbee, satellite, WiFi Direct, etc.

FIGS. 4-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
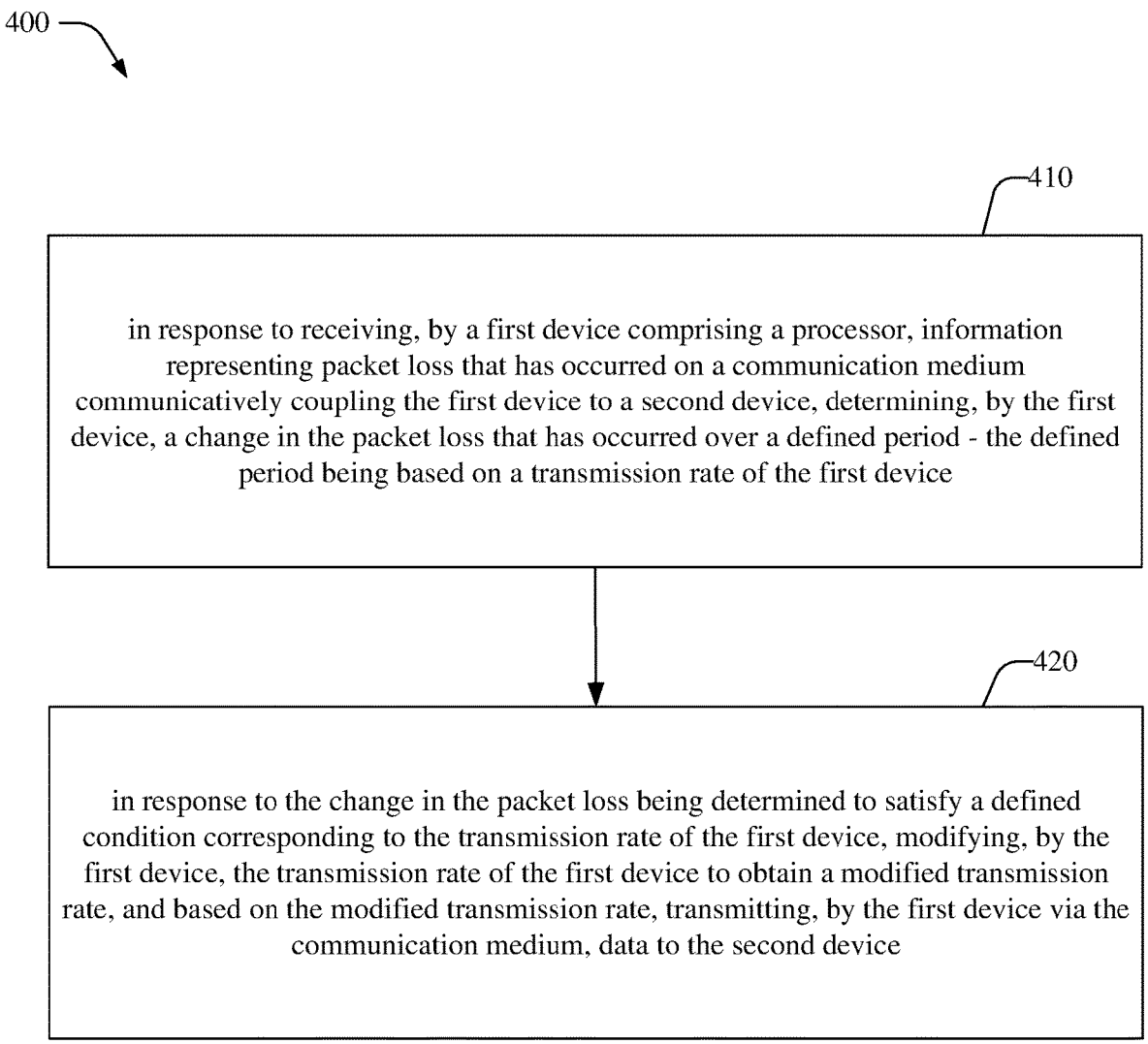
FIG. 4 illustrates a flowchart of a method associated with maximizing throughput on a variable bandwidth communication interface, in accordance with various example embodiments.

Referring now to FIG. 4, a flowchart of a method (400) associated with maximizing throughput on a variable bandwidth communication interface is illustrated, in accordance with various example embodiments. At 410, in response to receiving, by a first device (e.g., 102, 104, 210) comprising a processor, information representing packet loss that has occurred on a communication medium communicatively coupling the first device to a second device (e.g., 210, 104, 102), determining, by the first device, a change in the packet loss that has occurred over a defined period—the defined period being based on a transmission rate of the first device.

At 420, in response to the change in the packet loss being determined to satisfy a defined condition corresponding to the transmission rate of the first device, modifying, by the first device, the transmission rate of the first device to obtain a modified transmission rate, and based on the modified transmission rate, transmitting, by the first device via the communication medium, data to the second device Now referring to FIGS. 5-9, flow charts of a method associated with maximizing throughput on a variable bandwidth communication interface based on respective transmission rate states are illustrated, in accordance with various example embodiments. In this regard, the respective transmission rate states comprise a maximum transmission rate state corresponding to a defined maximum data transmission rate, a reducing transmission rate state corresponding to a data transmission rate that is being decreased, a minimum transmission rate state corresponding to a defined minimum data transmission rate, a steady state, or stable, transmission rate state corresponding to a data transmission rate that is not being changed, and an increasing transmission rate state corresponding to a data transmission rate that is being increased.

Figure 5:
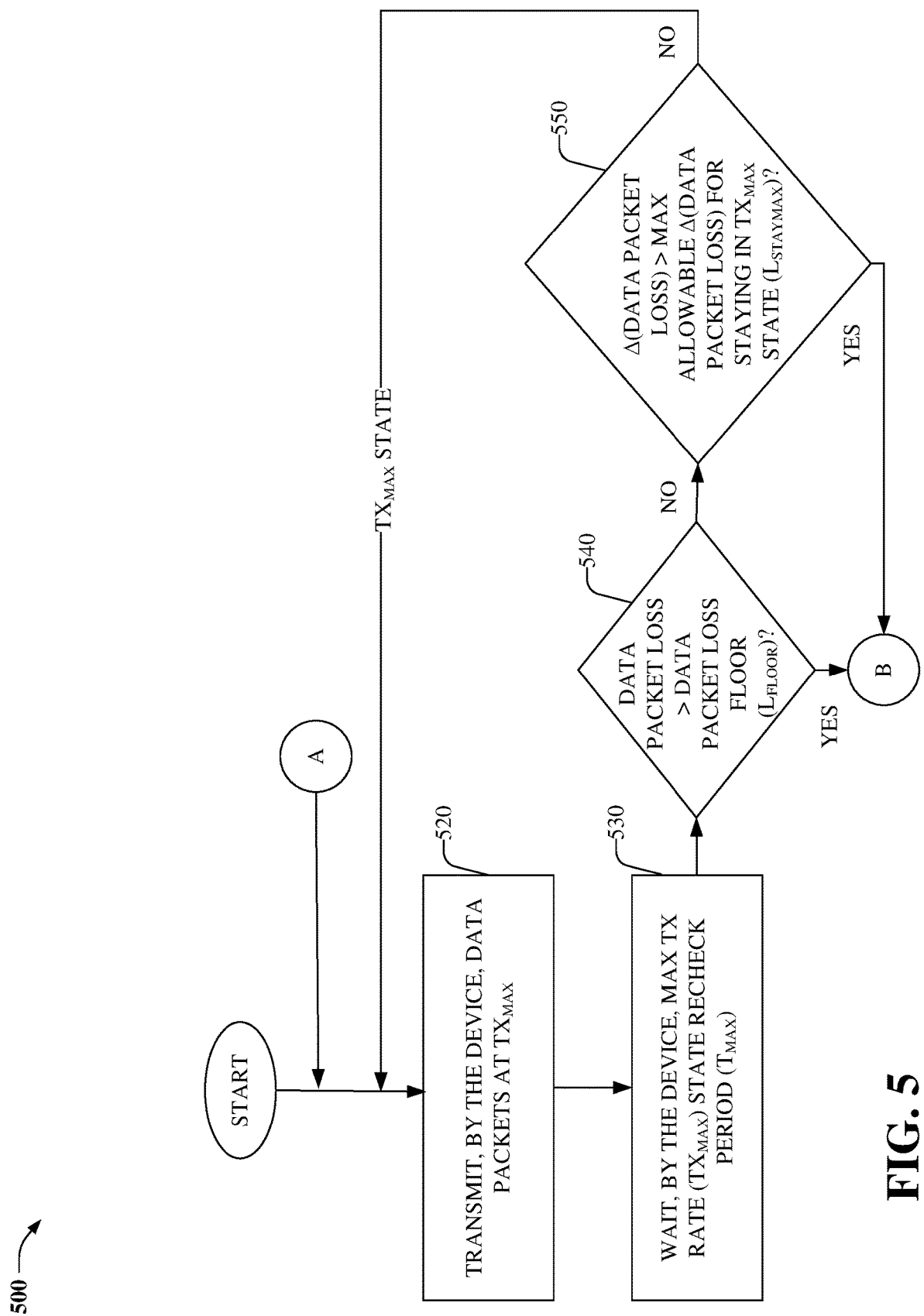
FIG. 5 illustrates a flowchart of a method associated with maximizing throughput on a variable bandwidth communication interface corresponding to a maximum transmission rate state, in accordance with various example embodiments.

FIG. 5 illustrates a flowchart associated with maximizing the throughput on the variable bandwidth communication interface with respect to the maximum transmission rate state, in accordance with various example embodiments. In this regard, a transmission rate of the device, of a transceiver of the device, etc. has been set to the defined maximum data transmission rate. At 520, a device (102, 104, 210) comprising a processor transmits data packets at the defined maximum data transmission rate. At 530, the device waits, holds, delays, etc. a maximum transmission rate state recheck period. At 540, the device determines whether data packet loss that has been determined by the device is greater than a defined data packet loss floor, e.g., a defined maximum amount of absolute packet loss.

In this regard, in response to a determination that the data packet loss is greater than the defined data packet loss floor, flow continues to 610, at which the device reduces the transmission rate by a defined amount, decrement, etc.; otherwise flow continues to 550, at which the device determines whether a change in the data packet loss, e.g., computed as the data packet loss over, based on, etc. the maximum transmission rate state recheck period, is greater than a defined maximum change in data packet loss for staying in the maximum transmission rate state.

In response to a determination that the change in the data packet loss is greater than the defined maximum change in data packet loss for staying in the maximum transmission rate state, flow continues to 610; otherwise flow returns to 520.

Figure 6:
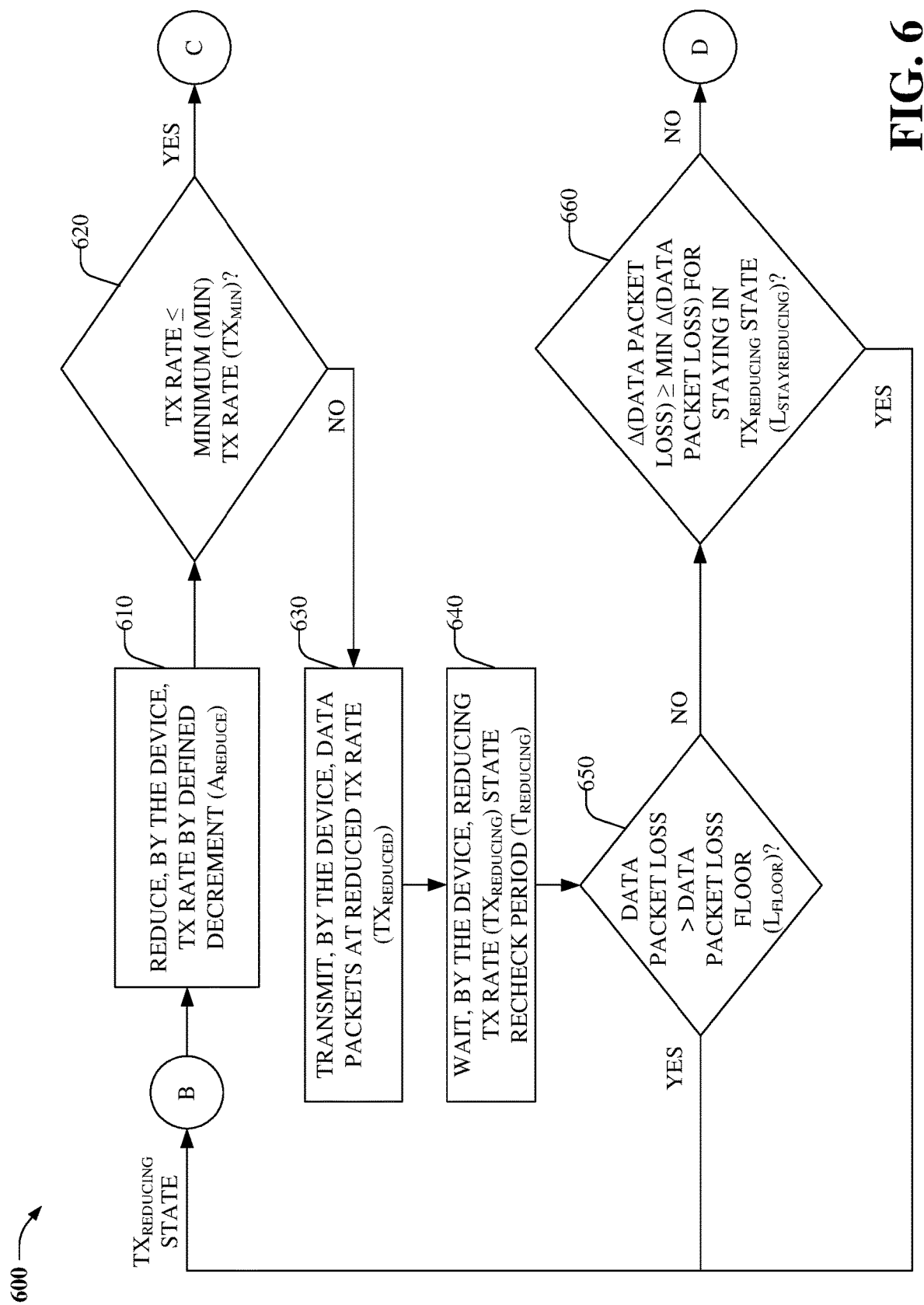
FIG. 6 illustrates a flowchart of a method associated with maximizing throughput on a variable bandwidth communication interface corresponding to a reducing transmission rate state, in accordance with various example embodiments.

FIG. 6 illustrates a flowchart associated with maximizing the throughput on the variable bandwidth communication interface with respect to the reducing transmission rate state, in accordance with various example embodiments. In this regard, at 610 (as described above) the device reduces the transmission rate by the defined amount, decrement, etc. At 620, the device determines whether the transmission rate is less than or equal to the minimum transmission rate. In this regard, in response to a determination that the transmission rate is less than or equal to the minimum transmission rate, flow continues to 710, at which the device sets that transmission rate to the minimum transmission rate; otherwise flow continues to 630, at which the device transmits data packets at the reduced transmission rate.

Flow continues from 630 to 640, at which the device waits, holds, delays, etc. a reducing transmission rate state recheck period. At 650, the device determines whether data packet loss that has been determined by the device is greater than the defined data packet loss floor. In this regard, in response to a determination that the data packet loss is greater than the defined data packet loss floor, flow returns to 610, at which the device reduces the transmission rate by the defined amount, decrement, etc.; otherwise flow continues to 660, at which the device determines whether a change in the data packet loss, e.g., computed as the data packet loss over, based on, etc. the reducing transmission rate state recheck period, is greater than or equal to a defined minimum change in data packet loss for staying in the reducing transmission rate state.

In this regard, in response to a determination that the change in the data packet loss is greater than or equal to the defined minimum change in data packet loss for staying the reducing transmission rate state, flow returns to 610, at which the device reduces the transmission rate by the defined amount, decrement, etc.; otherwise flow continues to 810, at which the device waits, holds, delays, etc. a stable transmission rate state recheck period.

Figure 7:
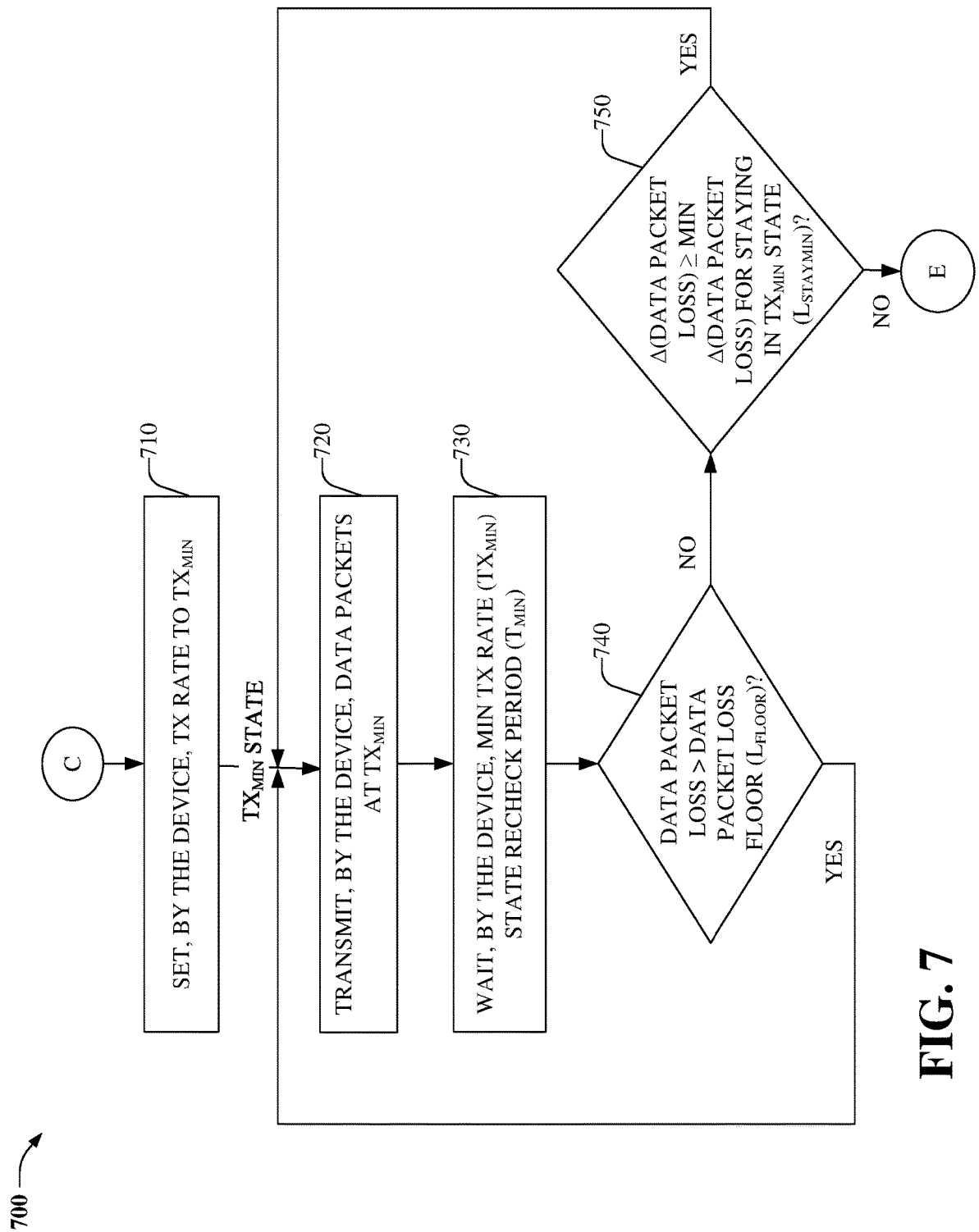
FIG. 7 illustrates a flowchart of a method associated with maximizing throughput on a variable bandwidth communication interface corresponding to a minimum transmission rate state, in accordance with various example embodiments.

Referring now to FIG. 7, a flowchart associated with maximizing the throughput on the variable bandwidth communication interface with respect to the minimum transmission rate state is illustrated, in accordance with various example embodiments. In this regard, at 710, the device sets the transmission rate to the minimum transmission rate. At 720, the device transmits data packets at the minimum transmission rate. At 730, the device waits, holds, delays, etc. a minimum transmission rate state recheck period.

In turn, at 740, the device determines whether data packet loss that has been determined by the device is greater than the defined data packet loss floor. In this regard, in response to a determination that the data packet loss is greater than the defined data packet loss floor, flow returns to 720, at which the device transmits data packets at the minimum transmission rate; otherwise flow continues to 750, at which the device determines whether a change in the data packet loss, e.g., computed as the data packet loss over, based on, etc. the minimum transmission rate state recheck period, is greater than or equal to a defined minimum change in data packet loss for staying in the minimum transmission rate state.

In this regard, in response to a determination that the change in the data packet loss is greater than or equal to the defined minimum change in data packet loss for staying the minimum transmission rate state, flow returns to 720, at which the device transmits data packets at the minimum transmission rate; otherwise flow continues to 910, at which the device increases the transmission rate by a defined increment, amount, etc.

Figure 8:
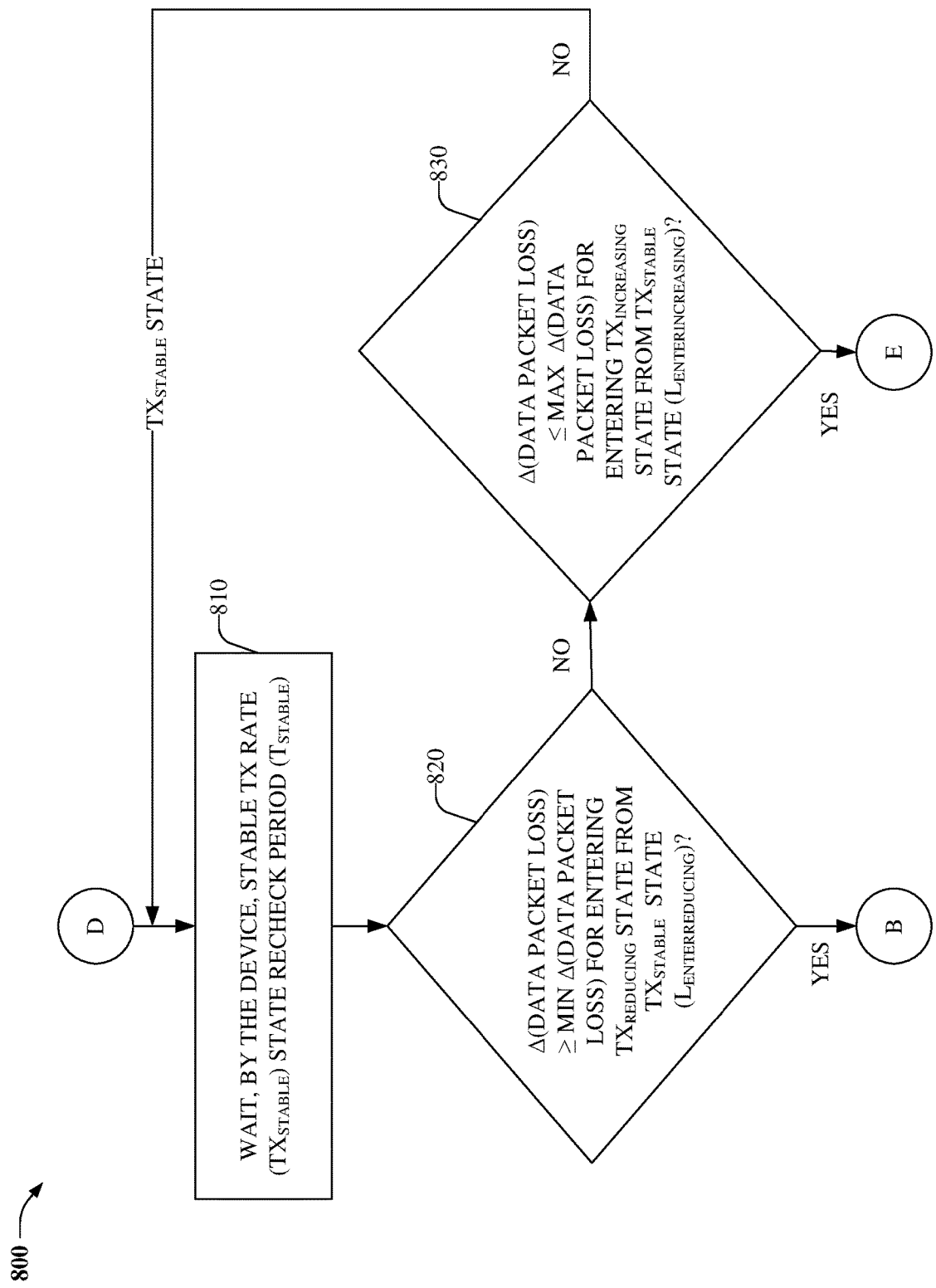
FIG. 8 illustrates a flowchart of a method associated with maximizing throughput on a variable bandwidth communication interface corresponding to a stable transmission rate state, in accordance with various example embodiments.

FIG. 8 illustrates a flowchart of a method associated with maximizing throughput on a variable bandwidth communication interface corresponding to a stable transmission rate state, in accordance with various example embodiments. At 810, the device waits, holds, delays, etc. a stable transmission rate state recheck period. In turn, at 820, the device determines whether a change in the data packet loss, e.g., computed as the data packet loss over, based on, etc. the stable transmission rate state recheck period, is greater than or equal to a defined minimum change in data packet loss for entering the reducing transmission rate state from the stable transmission rate state.

In this regard, in response to a determination that the change in the data packet loss is greater than or equal to the defined minimum change in data packet loss for entering the reducing transmission rate state from the stable transmission rate state, flow continues to 830, at which the device determines whether the change in data packet loss is less than or equal to a maximum change in data packet loss for entering the increasing transmission rate state from the stable transmission rate state; otherwise flow continues to 610, at which the device reduces the transmission rate by the defined decrement, amount, etc.

Figure 9:
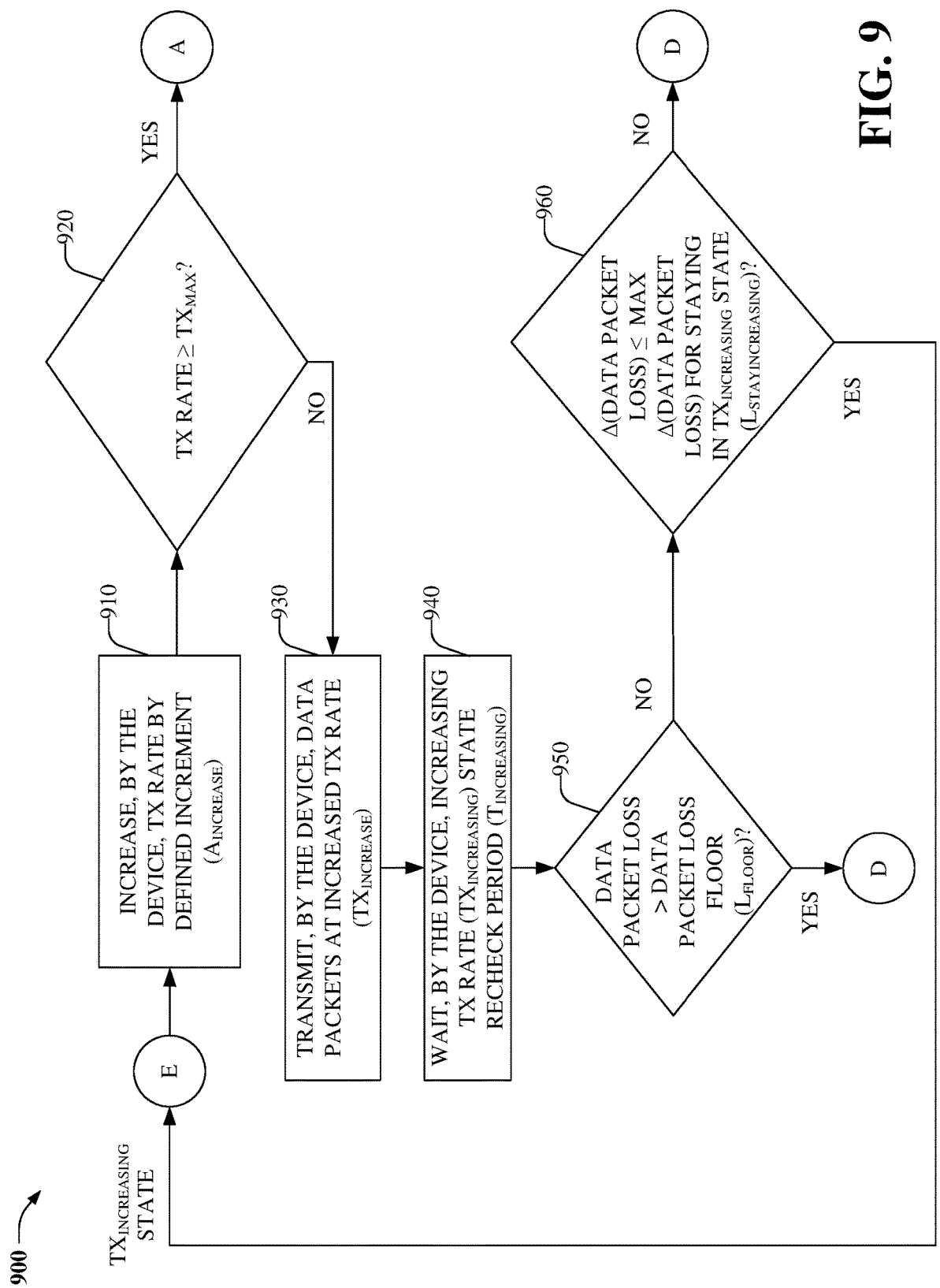
FIG. 9 illustrates a flowchart of a method associated with maximizing throughput on a variable bandwidth communication interface corresponding to an increasing transmission rate state, in accordance with various example embodiments.

Referring now to FIG. 9, a flowchart of a method associated with maximizing throughput on a variable bandwidth communication interface corresponding to an increasing transmission rate state is illustrated, in accordance with various example embodiments. At 910, the device increases the transmission rate by a defined increment, amount, etc. to obtain an increased data transmission rate. At 920, the device determines whether the transmission rate is greater than or equal to the defined maximum data transmission rate. In this regard, in response to a determination that the transmission rate is greater than or equal to the defined maximum data transmission rate, flow continues to 510, at which the device sets the transmission rate to the defined maximum data transmission rate; otherwise flow continues to 930, at which the device transmits data packets at the increased data transmission rate.

At 940, the device waits, holds, delays, etc. an increasing transmission rate state recheck period. In turn, at 950, the device determines whether data packet loss that has been determined by the device is greater than a defined data packet loss floor, e.g., a defined maximum amount of absolute packet loss.

In this regard, in response to a determination that the data packet loss is greater than the defined data packet loss floor, flow continues to 810; otherwise, flow continues to 960, at which the device determines whether a change in the data packet loss, e.g., computed as the data packet loss over, based on, etc. the increasing transmission rate state recheck period, is less than or equal to a defined maximum change in data packet loss for staying in the increasing transmission rate state.

At 960, if it is determined that the change in the data packet loss is less than or equal to the defined maximum change in data packet for staying in the increasing transmission rate state, flow returns to 910; otherwise flow continues to 810.

Figure 10:
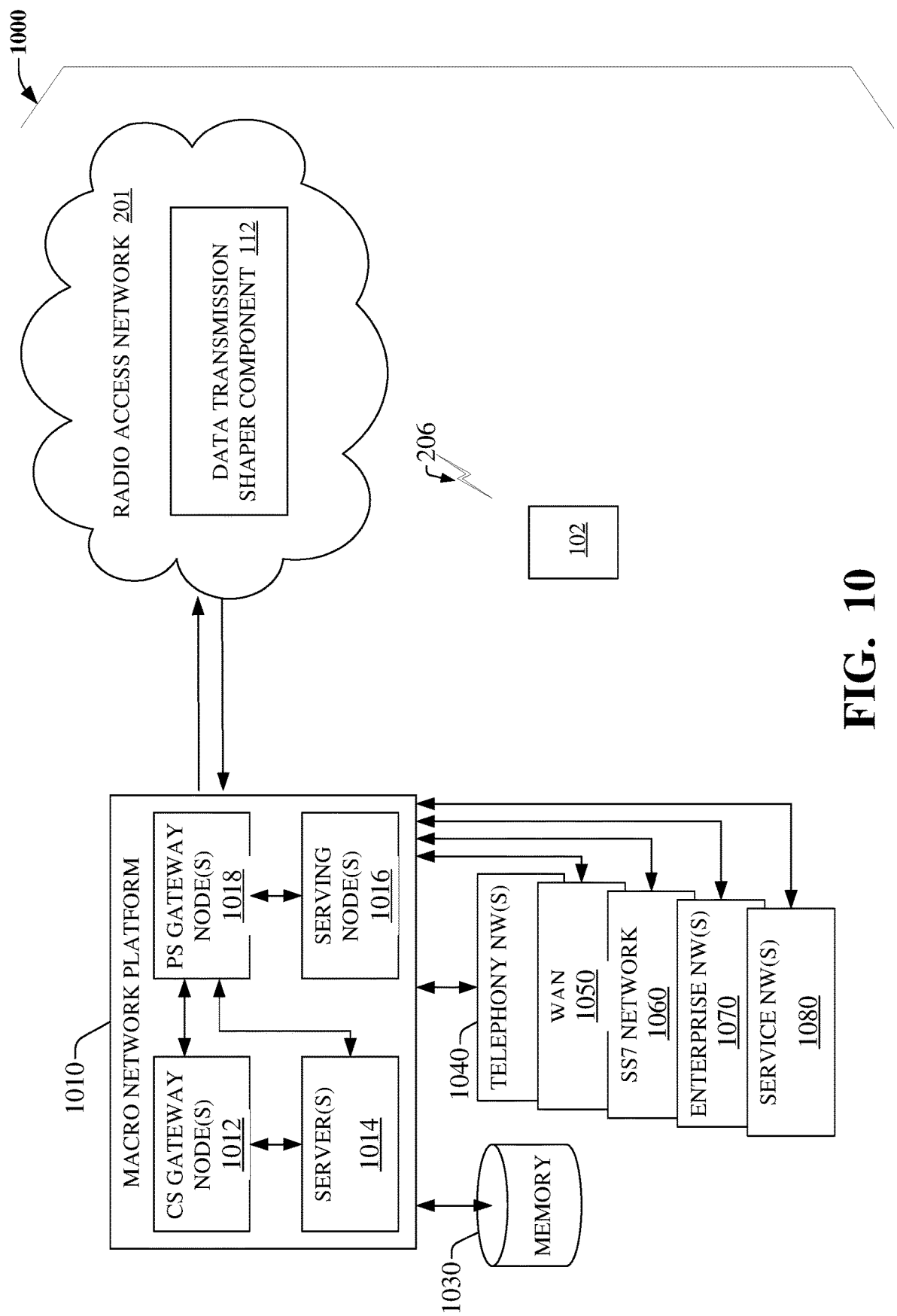
FIG. 10 illustrates a block diagram of a wireless network environment, in accordance various example embodiments.

With respect to FIG. 10, a wireless communication environment 1000 including macro network platform 1010 is illustrated, in accordance with various embodiments. Macro network platform 1010 serves or facilitates communication with a device (e.g., 102) via RAN 201. It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, 5G, etc. that can be associated with RAN 201, macro network platform 1010 can be embodied in a core network. It is noted that RAN 201 can include base station(s), base transceiver station(s), access point(s), etc. (e.g., eNBs, gNBs, etc.) and associated electronic circuitry and deployment site(s), in addition to a wireless radio link (e.g., 206) operated in accordance with the base station(s), etc. Accordingly, RAN 201 can comprise various coverage cells, or wireless coverage areas. In addition, it should be appreciated that elements and/or components, e.g., of RAN 201, can be located/included within one or more components/elements, e.g., hardware, software, etc., of wireless communication environment 1000, e.g., macro network platform 1010, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via data transmission shaper component 112. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signaling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via RAN 201, with served devices, communication devices, etc. Such data sessions can include traffic exchange with networks external to macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of a device (e.g., 102), etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via RAN 201; and so forth. Memory 1030 can also store information from at least one of telephony network(s) 1040, WAN 1050, SS7 network 1060, enterprise NW(s) 1070, or service NW(s) 1080.

In one or more embodiments, components of wireless communication environment 1000 can provide communication services to the device utilizing an over-the-air wireless link (e.g., 206) via RAN 201. In this regard, RAN 201 can include one or more: macro, Femto, or pico access points (APs) (not shown); base stations (BS) (not shown); landline networks (e.g., optical landline networks, electrical landline networks) (not shown) communicatively coupled between the device and macro network platform 1010, etc.

Wireless communication environment 1000 can include one or more of the Internet (or another communication network (e.g., IP-based network)), or DSL-type or broadband network facilitated by Ethernet or other technology. In various embodiments, wireless communication environment 1000 can include hardware and/or software for allocating resources to the device and RAN 201, converting or enforcing protocols, establishing and/or providing levels of quality of service (QoS), providing applications or services, translating signals, and/or performing other desired functions to facilitate system interoperability and communication to/from the device and RAN 201.

In other embodiment(s), wireless communication environment 1000 can include data store component(s), a memory configured to store information, computer-readable storage media storing computer-executable instructions, e.g., memory component 340, memory 1030, etc. enabling various operations performed via wireless system as described herein.

As it employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store," "memory storage," "memory component", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory component 340, memory 1030, system memory 1106 (see below), external storage 1116 (see below), and/or memory storage 1152 (see below). Further, nonvolatile memory can be included in read only memory (ROM), programmable ROM (PROM), electrically programmable ROM (EPROM), electrically erasable ROM (EEPROM), or flash memory. Volatile memory 1020 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
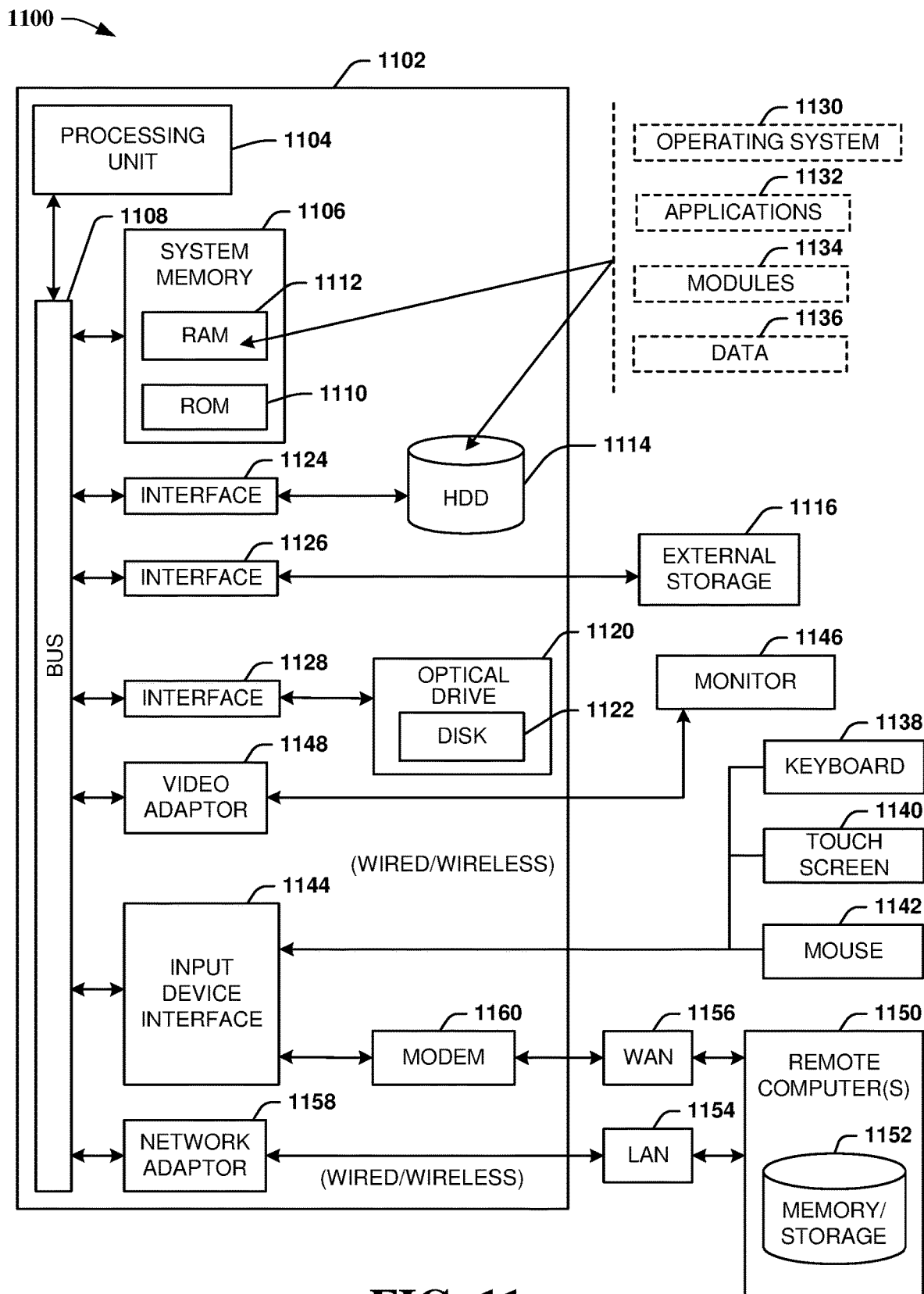
FIG. 11 is a block diagram representing an illustrative non-limiting computing system or operating environment in which one or more aspects of various embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a wireless system (see e.g., 101), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., 102, 104, 210), including but not limited to: based on information that was received from a second communication device via a communication link communicatively coupling a first communication device to the second communication device, determining a rate of change of data packet loss of a first group of data packets that have been transmitted, based on a first data transmission rate via the communication link, from the first communication device to the second communication device.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first communication device, comprising:
   a processor; and
   a memory that stores executable instructions that, when executed by the processor, facilitate performance of operations by the processor, comprising:
      based on information that was received from a second communication device via a communication link communicatively coupling the first communication device to the second communication device, determining, based on a defined recheck period that is based on respective data transmission rates, a rate of change of data packet loss of a first group of data packets that have been transmitted, based on a first data transmission rate of the respective data transmission rates via the communication link, from the first communication device to the second communication device;
      in response to the first data transmission rate being increased to a defined maximum transmission rate, reducing the defined recheck period to facilitate a determination of the rate of change of data packet loss based on the reduced defined recheck period; and
      in response to the rate of change of data packet loss being determined to satisfy a defined condition that is based on a defined state of a group of defined states corresponding to the respective data transmission rates,
         modifying the first data transmission rate to obtain a second data transmission rate, and
         transmitting, based on the second data transmission rate, a second group of data packets to the second communication device.

2. The first communication device of claim 1, wherein the defined condition is a first defined condition, and wherein the operations further comprise:
   in response to the rate of change of data packet loss being determined to satisfy a second defined condition that is based on the defined state, transmitting, based on the first data transmission rate, data packets to the second communication device.

3. The first communication device of claim 1, wherein the operations further comprise:
   determining the data packet loss based on respective sequence numbers that have been received, via the communication link, from the second communication device, and wherein the respective sequence numbers correspond to at least a portion of the first group of data packets that have been received by the second communication device.

4. The first communication device of claim 1, wherein the:
   defined recheck period is a first defined recheck period that is based on the first data transmission rate.

5. The first communication device of claim 4, wherein the second data transmission rate is greater than the first data transmission rate, wherein the rate of change of data packet loss is a first rate of change of data packet loss, and wherein the operations further comprise:
   determining a second rate of change of data packet loss that has occurred on the communication link based on a second defined recheck period that is less than the first defined recheck period.

6. The first communication device of claim 4, wherein the second data transmission rate is greater than the first data transmission rate, wherein the rate of change of data packet loss is a first rate of change of data packet loss, and wherein the operations further comprise:
   determining a second rate of change of data packet loss that has occurred on the communication link based on a second defined recheck period that is greater than the first defined recheck period.

7. The first communication device of claim 4, wherein the second data transmission rate is less than the first data transmission rate, wherein the rate of change of data packet loss is a first rate of change of data packet loss, and wherein the operations further comprise:
   determining a second change rate of data packet loss that has occurred on the communication link based on a second defined recheck period that is less than the first defined recheck period.

8. The first communication device of claim 1, wherein the operations further comprise:
determining whether an amount of the data packet loss is greater than a defined data packet loss floor.

9. The first communication device of claim 8, wherein the operations further comprise:
in response to the amount of the data packet loss being determined to be greater than the defined data packet loss floor, reducing the first data transmission rate by a defined amount to obtain the second data transmission rate.

10. The first communication device of claim 8, wherein the defined state is a first defined state, and wherein the operations further comprise:
in response to the amount of the data packet loss being determined to be less than or equal to the defined packet loss floor, determining whether the rate of change of data packet loss is greater than a maximum allowable rate of change of data packet loss for staying in a second defined state of the group of defined states corresponding to a maximum data transmission rate.

11. The first communication device of claim 10, wherein the operations further comprise:
in response to the rate of change of data packet loss being determined to be less than or equal to the maximum allowable rate of change of data packet loss for staying in the second defined state corresponding to the maximum data transmission rate, transmitting, based on the maximum data transmission rate, data packets to the second communication device.

12. The first communication device of claim 10, wherein the operations further comprise:
in response to the rate of change of data packet loss being determined to be greater than the maximum allowable change in data packet loss for staying in the second defined state corresponding to the maximum data transmission rate, reducing the first data transmission rate by a defined amount to obtain the second data transmission rate.

13. A method, comprising:
in response to receiving, by a first device comprising a processor, information representing packet loss that has occurred on a communication medium communicatively coupling the first device to a second device, determining, by the first device, a change in the packet loss that has occurred over a defined period, wherein the defined period is based on a transmission rate of the first device;
in response to the change in the packet loss being determined to satisfy a defined condition corresponding to the transmission rate of the first device,
modifying, by the first device, the transmission rate of the first device to obtain a modified transmission rate, and
based on the modified transmission rate, transmitting, by the first device via the communication medium, data to the second device; and
reducing the defined period based on the data transmission rate being determined to have increased to a defined maximum transmission rate to facilitate a determination of the change in the packet loss that has occurred over the reduced defined period.

14. The method of claim 13, further comprising:
receiving, by the first device, the information from the second device, wherein the information represents a number of data packets that the second device has received from the first device.

15. The method of claim 14, wherein the determining the change in the packet loss comprises:
determining, over the defined period, a change in the number of data packets that the second device has received from the first device.

16. The method of claim 13, wherein the defined condition is a first defined condition, and further comprising:
in response to the change in the packet loss being determined to satisfy a second defined condition corresponding to the transmission rate of the first device, transmitting, by the first device based on the transmission rate via the communication medium, the data to the second device.

17. The method of claim 13, wherein the modified transmission rate is greater than the transmission rate, wherein the change in the packet loss is a first change in packet loss, wherein the defined period is a first defined period, and further comprising:
determining, by the first device, a second change in packet loss that has occurred on the communication medium over a second defined period that is less than the first defined period.

18. The method of claim 13, wherein the modified transmission rate is less than the transmission rate, wherein the change in the packet loss is a first change in packet loss, wherein the defined period is a first defined period, and further comprising:
determining, by the first device, a second change in packet loss that has occurred on the communication medium over a second defined period that is less than the first defined period.

19. A non-transitory machine-readable medium, comprising executable instructions that, when executed by a first device comprising a processor, facilitate performance of operations, comprising:
in response to a change in data packet loss corresponding to a first group of data packets that have been transmitted, by the first device to a second device based on a transmission rate of the first device, being determined, over a defined period that is based on the transmission rate, to satisfy a defined condition with respect to the transmission rate, modifying the transmission rate to obtain a modified transmission rate;
based on the modified transmission rate, transmitting a second group of data packets to the second device; and
in response to the transmission rate being increased to a defined maximum transmission rate, reducing the defined period to facilitate a determination of the change in the data packet loss based on the reduced defined period.

20. The non-transitory machine-readable medium of claim 19, wherein the defined condition is a first defined condition, and wherein the operations further comprise:
in response to the change in data packet loss being determined, over the defined period, to satisfy a second defined condition with respect to the transmission rate, transmitting, based on the transmission rate, a second group of data packets to the second device.

* * * * *